Figure 1:
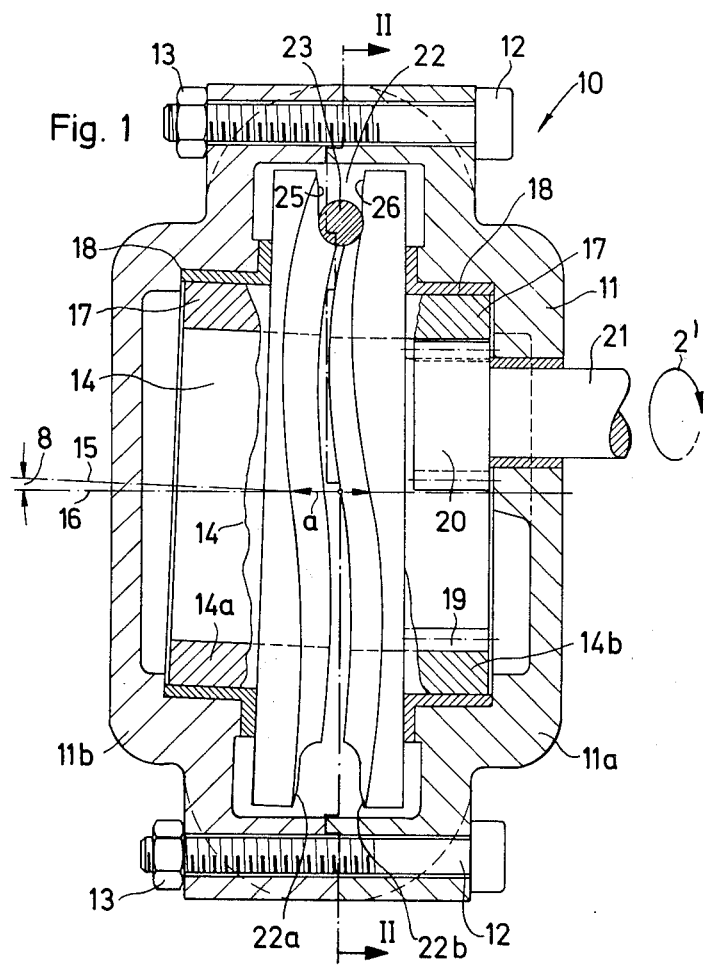

United States Patent [19]
Rinio

[11] 3,965,767
[45] June 29, 1976

[54] DRIVING PULLEY MECHANISM

[76] Inventor: Johannes Augustus Rinio, 7800 Versailles, 5, Promenade Venezia, Grand-siede, France

[22] Filed: Nov. 29, 1973

[21] Appl. No.: 420,009

[30] Foreign Application Priority Data
Dec. 1, 1972 Germany............................ 2258833

[52] U.S. Cl............................. 74/230.24; 254/191; 254/138
[51] Int. Cl.².................. A01K 73/06; F16H 55/56
[58] Field of Search........... 74/230.01, 230.3, 230.5, 74/230.11, 230.13, 229, 162, 163, 165, 166, 144, 148, 230.24; 254/138, 190 R, 192, 191, 197

[56] References Cited
UNITED STATES PATENTS

| | | | |
|---|---|---|---|
| 305,931 | 9/1884 | Kitson................................ | 74/230.24 |
| 2,749,759 | 6/1956 | Kienhofer............................ | 74/229 |
| 2,802,366 | 8/1957 | Borner................................ | 74/230.5 |
| 3,193,254 | 7/1965 | Minnick............................... | 254/138 |
| 3,250,514 | 5/1966 | Hamalainen........................ | 254/138 |
| 3,302,932 | 2/1967 | Wallin................................. | 74/230.5 |
| 3,382,398 | 5/1968 | Austin................................ | 254/138 |
| 3,643,921 | 2/1972 | Puretic............................... | 254/138 |
| 3,836,120 | 9/1974 | Niskin................................ | 254/138 |

FOREIGN PATENTS OR APPLICATIONS

| | | | |
|---|---|---|---|
| 10,772 | 8/1908 | Denmark............................ | 254/138 |
| 770,286 | 1/1954 | United Kingdom.............. | 74/230.24 |

*Primary Examiner*—Samuel Scott
*Assistant Examiner*—A. Russell Burke
*Attorney, Agent, or Firm*—John J. Dennemeyer

[57] ABSTRACT

A driving pulley mechanism for multiple purpose hauling devices comprises a driving pulley formed by two oppositely inclined pulley halves having each a cable groove half at its peripheral edge. The pulley halves are pressed in a direction toward each other at their apex supporting the cable.

7 Claims, 10 Drawing Figures

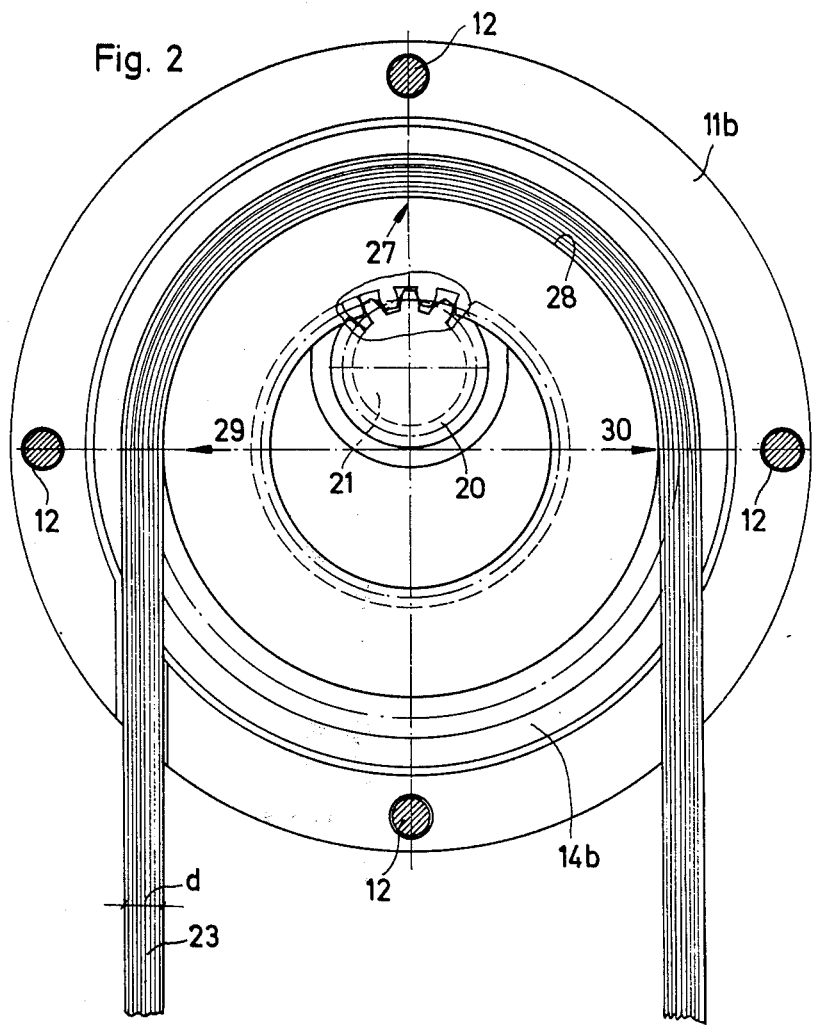

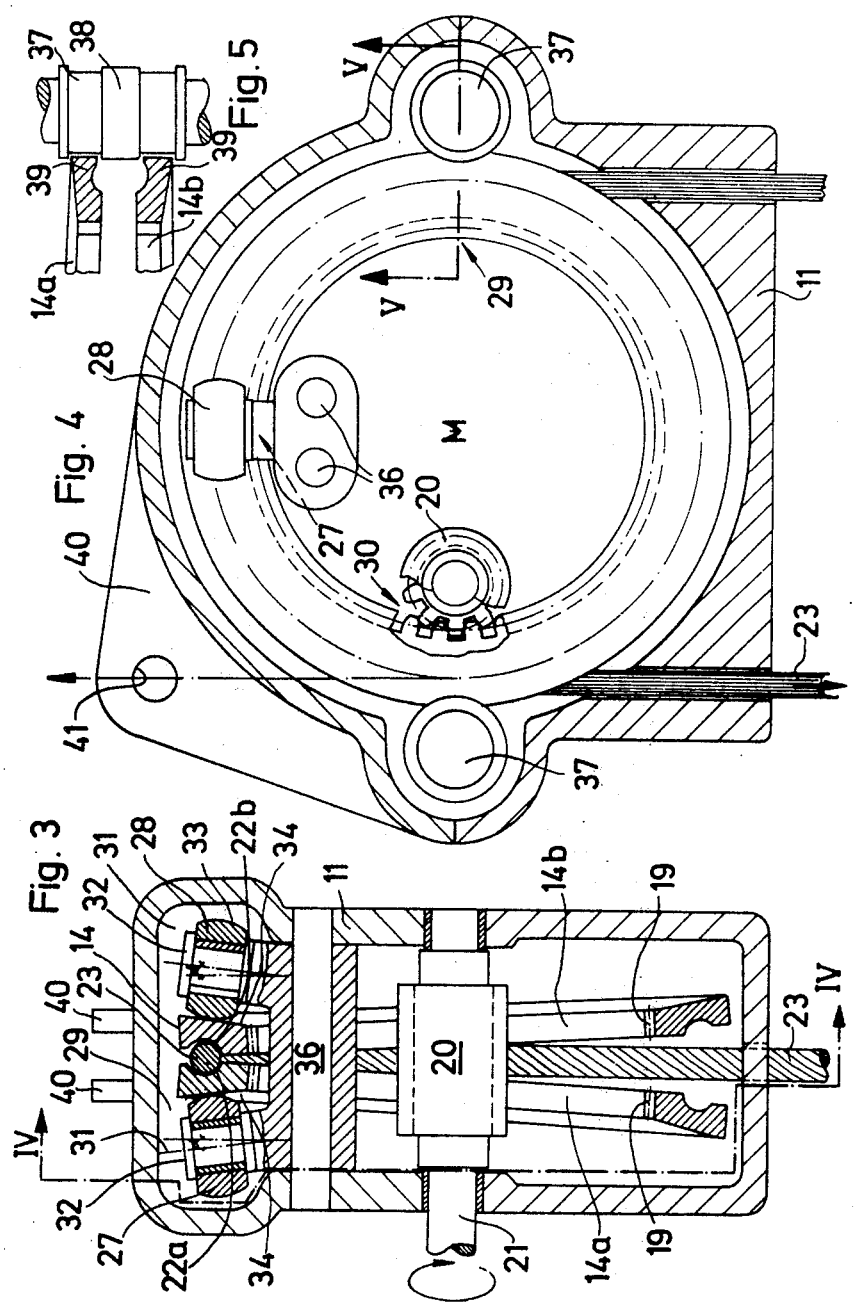

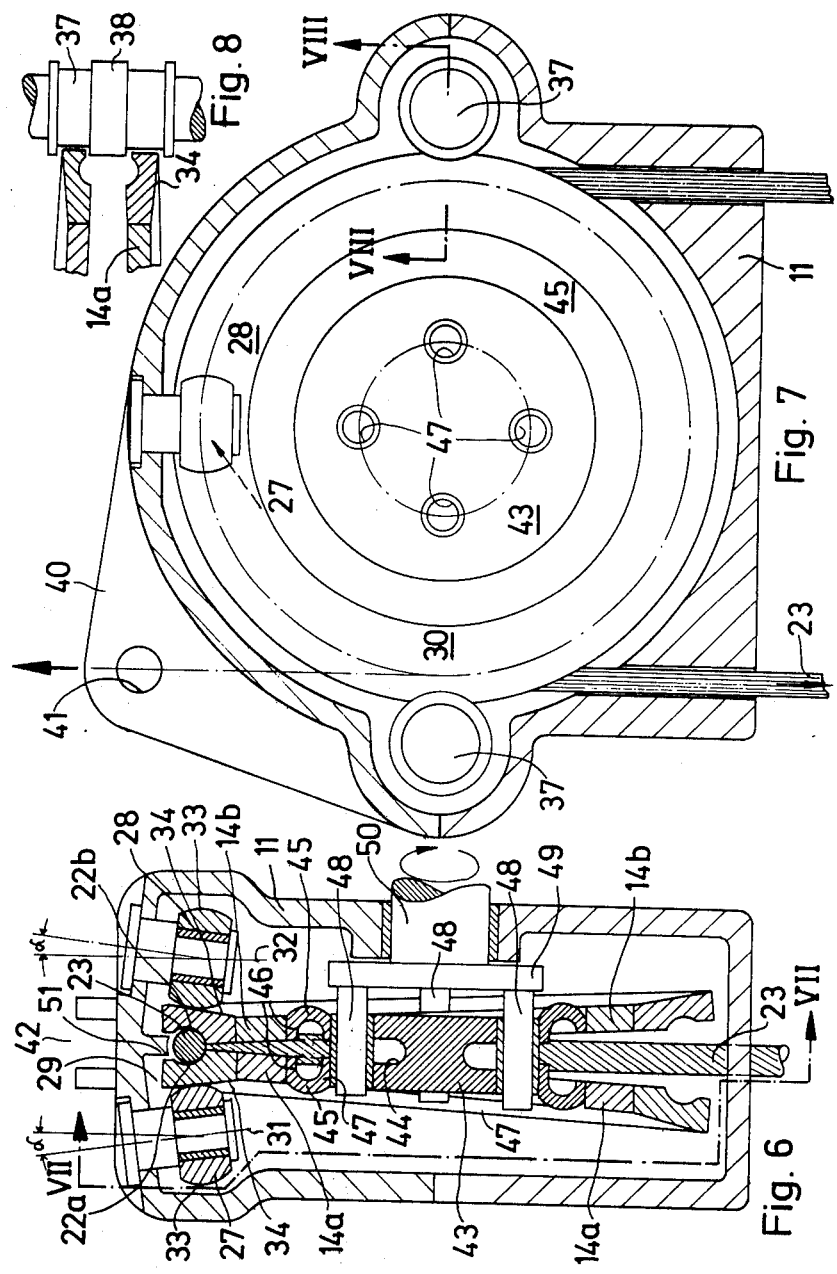

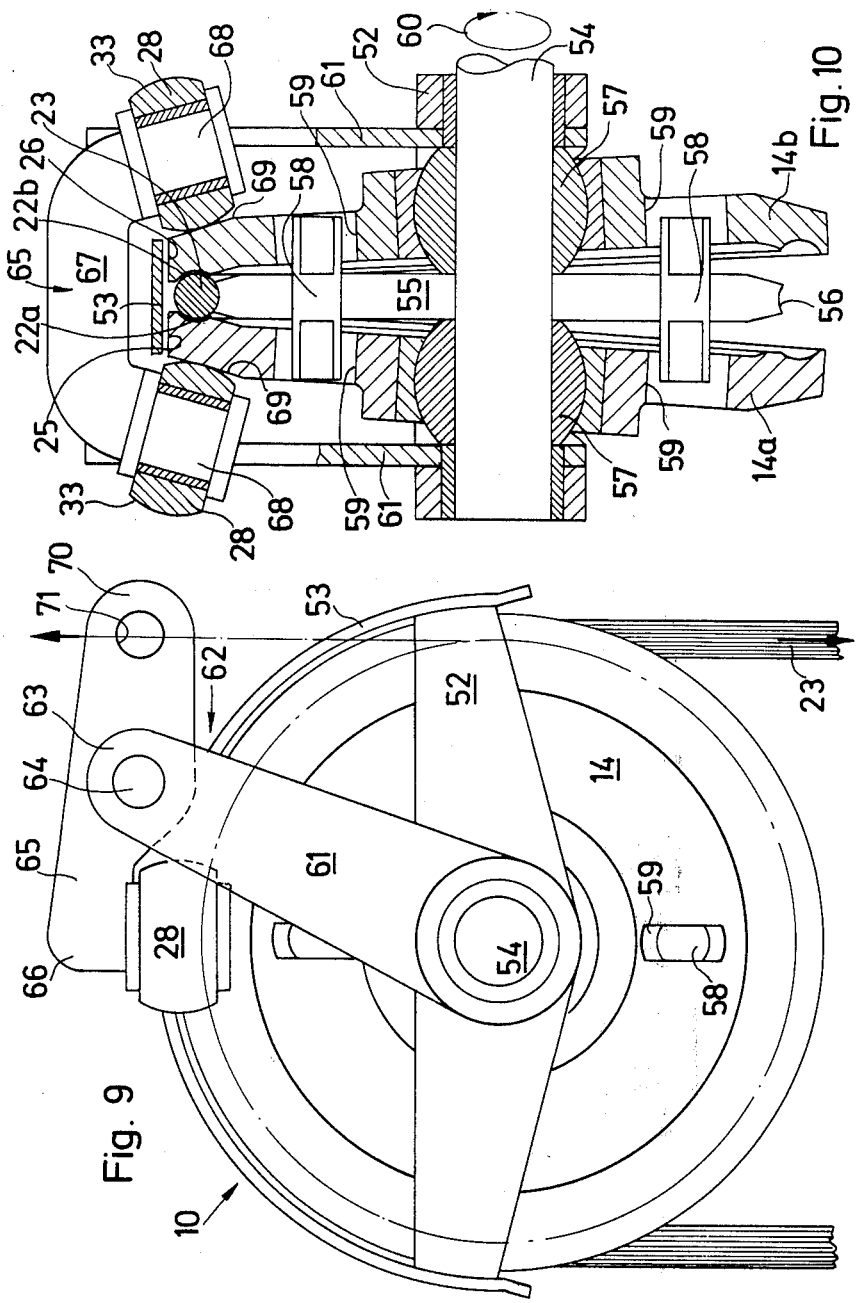

DRIVING PULLEY MECHANISM

The invention relates to a driving pulley mechanism having a driving pulley, particularly for multiple purpose hauling devices incorporating a traction cable travelling therethrough.

Driving pulley mechanisms having a driving pulley for elevators are known, wherein a cable or a plurality of cables are located side-by-side in the cable grooves of the driving pulley which is driven by a motor. The transmission of the torque is realized by friction between the cable and the driving pulley in the cable grooves, which may be semi-round or also trapezoidal to increase the clamping effect.

While in driving pulley mechanisms due to the cable loading on both sides of the driving pulley by the elevator cage on one side and the counterweight on the other side the normal pressure force acting between the cable and the driving pulley is large enough to transmit the torque exerted on the driving pulley already in case of an angle of contact less than 180° to the cable, the torque transmission is not readily possible in multiple purpose hauling devices with a traversing traction cable because in these devices only one end of the cable is loaded while the other end is freely suspended without load. On the other hand it is not readily possible in multiple purpose hauling devices, which must have a simple and handy construction, to increase the angle of contact by arranging additional driving pulleys.

The object of the invention is to provide a driving pulley mechanism having a driving pulley, which is particularly suited for multiple purpose hauling devices with a traversing traction cable, wherein a load is suspended only from one cable end.

According to the invention, this is obtained in that the driving pulley consists of two pulley halves inclined with respect to each other and having each at their peripheral edge a cable groove half, and that the pulley halves are pressed toward each other at the apex of their peripheral edge supporting the cable.

Due to this construction it is possible to exert a transverse pressure on the cable running over the cable pulley and to clamp the cable at the apex of the driving pulley so that also high loads suspended only at one end of the cable may be moved.

The pulley halves are appropriately inclined with respect to each other. This has the advantage that the cable enters and leaves the driving pulley at points where the cable groove halves present a greater distance from each other so that no constraint occurs at these points. The clamping force is then applied progressively to the entering cable until it reaches its maximum at the apex and decreases thereafter progressively until the cable leaves the driving pulley again completely free and without any lateral constraint.

Adjacent the peripheral edge of the pulley halves several elastically yieldable clamp devices may be arranged in spaced relationship on the surface of the pulley halves, and the pulley halves may be pressed apart by a spreading device, at least at one point located opposite the apex which supports the cable. Such a construction is particularly simple and is especially appropriate to raise smaller loads. In this arrangement the spreading device may preferably consist of a driving pulley which engages the cable groove and transmits the drive torque by friction to the driving pulley.

When a higher clamp pressure on the cable is necessary, it is preferable to rotatably mount the pulley halves in a fixed frame so that their axes of rotation are inclined at a flat angle relative to each other. The cable groove may then extend in the form of a sine curve about the periphery of the driving pulley, and one pulley half may be driven while the other pulley half is mounted for free rotation. This embodiment has the advantage that the cable clamps itself into the sine-shaped cable groove due to the load suspended on one cable end, when the one pulley half rotates slightly relative to the other pulley half so that the spacing of the cable groove halves changes with regard to each other.

The clamp pressure which is to be exerted in the cable may also be generated by pressing the cable halves at the apex supporting the cable against each other by means of pressure rollers. These pressure rollers are mounted rotatably in the transmission housing. In this case it is preferable to incline the axes of the pressure rollers relative to the central plane of the driving pulley and to arrange the driving pulley which has in the region of the pressure rollers outer surfaces inclined with regard to the central plane so as to be radially displaceable relative to the pressure rollers, or conversely to arrange the pressure rollers so as to be displaceable in the radial direction of the driving pulley. In case of a relative radial displacement between the driving pulley and the pressure rollers a clamp pressure is generated by the wedge action which depends on the measure of displacement.

It is particularly appropriate to provide the pulley halves in the region of the cable groove with outer surfaces inclined to the pulley center point, on which they are suspended freely between the pressure rollers whose axes are also inclined relative to the pulley center point. This construction has the advantage that the clamping force exerted on the cable depends on the weight of the load suspended from the cable and it becomes greater with increasing load.

The pulley halves may consist of ring gears with internal toothing which are commonly driven by means of a pinion. In another embodiment the driving pulley halves may have apertures into which the arms of a claw coupling extend. Such a construction is especially advantageous, because in this case the driving pulley may consist of two loose halves which may be simply inserted from the side between the pressure rollers and into whose cable grooves the cable may be easily pushed. Both during this procedure and also during operation the pulley halves may be radially displaced without the need to disassemble the drive means or to change or adjust their position.

In a modified embodiment the pulley halves may consist of rings which are connected to a hub of elastic material common to both pulley halves, and in this hub eccentrically arranged sleeves are provided for the arms of the claw coupling. In this case the hub may consist of rubber and may be provided with two radially and axially deformable peripheral ribs on which the pulley halves are fixed. This construction has the advantage that both pulley halves are combined in a single unit and that the pulley halves may move nevertheless axially with regard to each other and also in a radial direction relative to the hub. Due to the arrangement of the deformable peripheral ribs no radial forces are transmitted to the hub also in case of a radial displacement of the pulley halves formed by the rings so that the bearing of the drive shaft is not loaded.

In another embodiment it may be preferable to mount the pulley halves on spaced spherical bearings arranged on a drive shaft to which a support disc located between the pulley halves is fixedly connected. This support disc carries the cable on its periphery and has eccentrically arranged driving pins extending into elongated holes of the pulley halves. In this case the support rollers arranged at the apex of the pulley halves are preferably disposed in a fork pressed radially against the driving pulley. The driving torque is transmitted in this case from the support disc through the driving pins to the driving pulley halves.

It is particularly appropriate to connect the fork with the support roller at one end of a loose rocker arm which is pivotably mounted on a support yoke carrying the drive shaft and the rotary shaft of the driving pulley and at whose other end the mechanism is freely suspended at a fixed point. This construction is very simple and permits to combine the drive motor with the driving pulley in a single, handy and compact unit which may be suspended without difficulties at a fixed point, for example on a frame or on a load hook and may then be put into operation. Due to the suspension on the rocker arm simultaneously a clamping pressure, which depends on the weight of the load, is transmitted by the support rollers to the driving pulley halves to that the clamping pressure exerted on the cable becomes greater with increasing load.

The invention will now be described in greater detail by referring to the embodiments shown in the accompanying drawings, wherein:

FIG. 1 is a first embodiment of the invention in a front view and partially in section, FIG. 2 shows the device of FIG. 1 in a vertical section according to line II—II, FIG. 3 shows another embodiment of the invention in a view similar to FIG. 1, FIG. 4 shows the device of FIG. 3 in a section according to line IV—IV of FIG. 3, FIG. 5 is a partial section through the driving pulley mechanism according to FIG. 4 in a section according to line V—V, FIG. 6 shows a third embodiment of the invention in a vertical cross-section, FIG. 7 shows the device of FIG. 6 in a vertical section according to line VII—VII, FIG. 8 is a partial section of FIG. 7 according to line VIII—VIII, FIG. 9 shows a fourth embodiment of the invention in a lateral view, and FIG. 10 shows the device of FIG. 1 partially in a front view and partially in cross-section.

The driving pulley mechanism 10 represented in FIGS. 1 and 2 consists of a two-part housing 11, the two parts 11a and 11b being connected together by four bolts 12 and nuts 13. In the interior of the housing 11 a driving pulley 14 is mounted which consists of two pulley halves 14a and 14b.

As can be seen from FIG. 1 the pulley half 14a is inclined with regard to the pulley half 14b so that the axes of rotation 15 and 16 of both pulley halves form a flat angle $\gamma$ with one another. The pulley halves 14a and 14b consist of rings which are each mounted with an axially projecting shoulder 17 in a friction bearing 18 of the housing 11. The pulley half 14b has an internal toothing 19 into which a drive pinion 20 engages whose pinion shaft 21 fixedly connected with the pinion 20 is rotatably mounted in the housing 11.

The other pulley half 14a opposite the pulley half 14b is freely mounted for rotation in its bearing 18 and is not driven.

Each pulley half 14a and 14b carries one half 22a respectively 22b of a cable groove 22 which extends in the embodiment of FIGS. 1 and 2 in the form of a sine curve about the periphery of the driving pulley 14. The cable 23 positioned in the cable groove 22 oscillates therefore along the half periphery of the driving pulley 14 to and fro transversely of the peripheral direction. Because only the one driving pulley half 14b is driven in the direction of the arrow 24, this pulley half may rotate in the peripheral direction relative to the other pulley half 14a. Therefore the position of the groove halves with respect to each other changes so that the cable is clamped in the groove between the two pulley halves transversely of its longitudinal extent when the driven pulley half 14b slides initially slightly in the peripheral direction along the cable and leads slightly relative to the non-driven pulley half 14a. The clamping pressure exerted at the apex on the cable 23 becomes increasingly larger as the pulley half 14b continues to rotate relative to the pulley half 14a, and as the spacing of the groove flanks 25 and 26 becomes smaller at the apex 27 of the peripheral edge 28 of the driving pulley 14.

It can be observed that due to the opposite inclination of the pulley halves 14a and 14b in this and in the following embodiments of the invention the cable 23 arrives at points 29 and 30 on the driving pulley 14 where the flanks 25 and 26 of the cable groove 22 still have a spacing $a$ which is greater than the diameter $d$ of the cable. This spacing $a$ between the flanks 25 and 26 of the cable groove 22 becomes continuously smaller in an upward direction until it reaches its minimum at the apex 27. Thus it is possible that the cable arrives without constraint at the point 29 and is then continuously more and more securely clamped toward the apex 27. From the apex 27 the clamp pressure decreases then again continuously until the cable 23 leaves the driving pulley 14 at the point 30 without constraint.

The angle $\gamma$ between the axes 15 and 16 of the driving pulley halves 14a and 14b is considerably exaggerated in all the Figures in order to make the principle clear. This angle is actually much smaller.

In the embodiment shown in FIGS. 3, 4 and 5, the driving pulley 14 consists also of two pulley halves 14a and 14b which have both an internal toothing 19 and which are driven in common by a drive pinion 20 mounted in the housing 11 by means of a shaft 21. Contrary to the preceding embodiment according to FIGS. 1 and 2 the pulley halves are here not guided in a rigid bearing of the housing but between two pressure rollers 27 and 28 which are mounted in the upper part 29 of the housing 11 by means of two pins 32 whose axes of rotation 31 extend radially to the driving pulley halves 14a and 14b and are inclined at an angle $\alpha$ relative to their plane.

The pressure rollers 27 and 28 which are freely rotatable on the pins 32 have a convex peripheral surface 33.

The driving pulley 14 consisting of the two pulley halves 14a and 14b is suspended between the pressure rollers 27 and 28 and between these pulley halves the cable pulley grooves 22a and 22b are clamped which enclose the cable 23 almost completely, In the region of the pressure rollers 27 and 28 the driving pulley halves 14a and 14b have outer surfaces 34 inclined toward their center point M by which they engage the convex peripheral surfaces 33 of the pressure rollers 27 and 28 and are supported by them.

At the inlet and outlet points 29 and 30 of the cable 23 which are offset relative to the apex 27 by 90°, guide rollers 37 are arranged which extend with a projecting peripheral ring 38 between the peripheral edges 39 of the driving pulley halves 14a and 14b to guide the pulley halves and to maintain them at a suitable interval so that the cable 23 may enter into the cable groove 22 and leave this groove again without constraint.

The housing 11 of the driving pulley mechanism according to FIGS. 3 and 4 is provided with two support ribs 40 having an ear 41 by which the housing is suspended at any appropriate fixed point. The ear 41 is located in alignment with the outgoing cable end.

It may be observed that the clamping pressure which is exerted at the apex 27 by both cable groove halves 22a and 22b on the cable 23 depends on how far the driving pulley is pulled downwardly between the two pressure rollers 27 and 28. This again is a function of the load which is suspended from the cable end arriving on the driving pulley at point 29. The embodiment shown in FIGS. 6, 7 and 8 is similar to the embodiment of FIGS. 3 to 5. Also in this case two pressure rollers 27 and 28 are again provided which are suspended in bearings at the upper portion 29 of the housing 11 in such a manner that their axes of rotation 31 and 32 extend radially with regard to the driving pulley and form an angle α relative to the central plane 42 of the driving pulley. Also in this embodiment guide rollers are provided and the driving pulley mechanism is also suspended as in the device shown in FIGS. 3 to 5 at a fixed point by means of an ear 41. The driving pulley consists of two rings 14a and 14b which rest with inclined surfaces 34 on the convex peripheral surfaces 33 of the pressure rollers and which have cable groove halves 22a and 22b in which they clamp the cable 23. Contrary to the preceding embodiment the driving pulley rings 14a and 14b are not independent of each other but both rings are connected to a rubber hub 43 which has at its periphery a deep peripheral slot 44. The edges which define this peripheral slot 44 laterally form two radially and axially deformable peripheral ribs 45 on whose outer edges 46 the driving pulley halves 14a and 14b are vulcanized or attached in some other suitable way.

Four eccentrically arranged metal sleeves 47 are additionally inserted into the hub 43 and the arms 48 of a claw coupling 49 project into these sleeves 47. The claw coupling is connected to a drive shaft 50 mounted in the housing 11.

A ledge 51 mounted above the apex 27 over the cable 23 prevents that the cable moves upwardly out of the cable groove 22 when it is introduced therein.

In the embodiment shown in FIGS. 9 and 10 the housing consists only of a yoke 52 embracing the driving pulley, and this yoke supports a metal cover sheet 53 which covers the drive pulley 14 over half of its peripheral surface. In the yoke 52 a drive shaft 54 is rotatably mounted to which a support disc 55 is fixedly connected and which is provided with a peripheral groove 56 on which the cable 23 is placed. At both sides of the support disc 55 the two pulley halves 14a and 14b of the driving pulley 14 are arranged in spaced relationship, the pulley halves having each near their peripheral edge at their internal faces turned toward the cable 23 a cable groove half 22a and 22b and the pulley halves being mounted on spherical bearings 57 of the drive shaft 54 and freely rotatable on these bearings and pivotable transversely relative to the axis of the drive shaft 54.

The support disc 55 carries two eccentrically arranged driving pins 58 which extend into associated elongated holes 59 in the two pulley halves 14a and 14b so that these two pulley halves are rotated in the direction of the arrow 60 in case of a rotation of the support disc 55 fixed on the drive shaft 54.

Two arms 61 of a support yoke 62 are mounted on the drive shaft 54 on the outside adjacent the spherical bearings 57 of the driving pulley halves 14a and 14b. The two arms 61 are rigidly connected together at their free ends 63 extending beyond the driving pulley 14 by means of a shaft 64 on which a loose rocking arm 65 is pivotably mounted, which in a horizontal projection is substantially U-shaped and carries at its one end 66 a fork 67 having two projections 68 extending obliquely downward. Each of these projections carries a pressure roller 28 which corresponds to the pressure rollers shown in the embodiments of FIGS. 3 and 6 and each has a convex peripheral surface 33 by which they engage inclined surfaces arranged adjacent the outer edges 25 and 26 of the driving pulley halves 14a and 14b at the outer sides to press the driving pulley halves in this region laterally against the cable 23.

At the other end 70 of the rocking arm 65 opposite to the fork 67 a support ear 71 is arranged by which the entire mechanism may be suspended at a fixed point.

It will be understood that the drive motor (not shown) may be connected directly to the yoke 52 and the support yoke 61 and may be drivingly coupled directly to the drive shaft 54. The driving pulley mechanism and the drive motor constitute in that case a small conpact unit may be suspended as such from a fixed point and which may be put immediately into operation. The lateral clamping pressure which is exerted by the pressure rollers 28 against the driving pulley halves 14a and 14b, is regulated by the load which is suspended from the cable 23.

What is claimed is:

1. A driving pulley mechanism for multiple purpose hauling devices including a driving pulley and a traction cable, said driving pulley consisting of two specularly identical halves inclined toward each other and comprising each one half of a cable groove, the improvement consisting in that said halves are pressed toward each other on opposite sides at the cable supporting apex of their peripheral edges by at least one elastically yieldable clamping device consisting of a pair of pressure rollers mounted rotatably in a fixed frame and wherein said pulley halves are pressed away from each other by a spreading device at least at one point opposite said apex.

2. The mechanism according to claim 1 wherein said spreading device consists of a drive roller engaging said cable groove.

3. A driving pulley mechanism for multiple purpose hauling devices including a driving pulley and a traction cable, said driving pulley consisting of two specularly identical halves inclined toward each other and comprising each one half of a cable groove, the improvement consisting in that:

said halves are pressed toward each other on opposite sides at the cable supporting apex of their peripheral edges by at least one elastically yieldable clamping device consisting of a pair of pressure rollers mounted rotatably in a fixed frame, the axes of said pressure rollers are inclined relative to the central plane of said driving pulley, said driving pulley has in the region of said pressure rollers outer surfaces inclined to said central plane, said driving pulley is radially displaceable relative to said pressure rollers, said pulley halves have in the region of said cable grooves outer surfaces inclined relative to the pulley center point M, said pulley halves are freely suspended from these surfaces between said pressure rollers whose axes are also inclined relative to said pulley center point M, and wherein the arms of a claw coupling are received in apertures provided in said driving pulley.

4. The mechanism according to claim 3 wherein said pulley halves consist of rings connected to a hub of elastic material common to both pulley halves, and excentrically arranged sleeves are provided in said hub for receiving the arms of said claw coupling.

5. The mechanism according to claim 3 wherein said hub is made of rubber material and has two radially and axially deformable peripheral ribs to which said pulley halves are connected.

6. A driving pulley mechanism for multiple purpose hauling devices including a driving pulley and a traction cable, said driving pulley consisting of two specularly identical halves inclined toward each other and comprising each one half of a cable groove, the improvement consisting in that:

said halves are pressed toward each other on opposite sides at the cable supporting apex of their peripheral edges by at least one elastically yieldable clamping device consisting of a pair of pressure rollers mounted rotatably in a fixed frame, the axes of said pressure rollers are inclinded relative to the central plane of said driving pulley, said driving pulley has in the region of said pressure rollers outer surfaces inclined to said central plane, said driving pulley is radially displaceable relative to said pressure rollers, said pulley halves are mounted on spherical bearings disposed in spaced relationship on a drive shaft to which a support disc located between said pulley halves is rigidly connected, said support disc supporting said cable on its periphery and having excentrically disposed driving pins extending into elongated holes of said pulley halves, and wherein said pressure rollers engaging said pulley halves at said apex are pivotably mounted in a fork pressed radially against said driving pulley.

7. The mechanism according to claim 6 wherein said mechanism is suspended freely from a fixed point at one end of a rocking arm mounted pivotably on a support yoke carried by the shaft of said driving pulley, and said fork is located at the other end of said rocking arm.

* * * * *